[11] 3,598,909

| | | | |
|---|---|---|---|
| [72] | Inventors | Reiichi Sasaki;<br>Teruo Kitani, both of Osaka, Japan | |
| [21] | Appl. No. | 747,563 | |
| [22] | Filed | July 25, 1968 | |
| [45] | Patented | Aug. 10, 1971 | |
| [73] | Assignee | Matsushita Electric Industrial Co. Ltd.<br>Osaka, Japan | |
| [32] | Priority | July 25, 1967, Aug. 21, 1967, Aug. 22,<br>1967, Sept. 21, 1967 | |
| [33] | | Japan | |
| [31] | | 42-48274, 42-54166, 42-54352, and<br>42-80763 | |

[54] HIGH-VOLTAGE GENERATOR CIRCUIT CONFIGURATION UTILIZING A CERAMIC TRANSFORMER
1 Claim, 6 Drawing Figs.

[52] U.S. Cl. .......................................... 178/7.3 R,
310/8.1, 330/5
[51] Int. Cl. ........................................... H01v 7/00,
H03f 13/00, H04n 5/44

[50] Field of Search ............................................ 178/7.3 E,
7.5 E, 6 PS; 330/5, 5.5; 310/8.5, 9.8, 8.6, 8.1;
315/26, 27, 27 XY

[56] References Cited
UNITED STATES PATENTS

| | | | |
|---|---|---|---|
| 2,606,304 | 8/1952 | Moore ........................ | 315/27 |
| 3,281,726 | 10/1966 | Schafft ........................ | 310/9.8 |
| 3,397,328 | 8/1968 | Schafft ........................ | 310/8.6 |
| 3,487,239 | 12/1969 | Schafft ........................ | 310/8.5 |

*Primary Examiner*—Robert L. Griffin
*Assistant Examiner*—John C. Martin
*Attorney*—Wenderoth, Lind & Ponack ABSTRACT: A high-voltage generator circuit configuration. A ceramic transformer which generates a high voltage and has plural resonant modes is connected to a horizontal deflection circuit which generates a pulse voltage containing harmonic components so as to drive said ceramic transformer in its resonant modes. A choke coil is wound on a deflection yoke and acts as a path for DC current so as to supply power to said horizontal deflection circuit.

R. SASAKI AND
T. KITANI
INVENTORS

INVENTORS
R. SASAKI AND T. KITANI
BY
Wenderoth, Lind & Ponack
ATTORNEYS

HIGH-VOLTAGE GENERATOR CIRCUIT CONFIGURATION UTILIZING A CERAMIC TRANSFORMER

BACKGROUND OF THE INVENTION

1. FIELD OF THE Invention

This invention relates to a high-voltage generator circuit for a television receiver, and more particularly to a high-voltage generator comprising a ceramic transformer instead of a conventional flyback-type pulse transformer.

2. DESCRIPTION OF THE PRIOR ART

Conventionally, a flyback-type pulse transformer is used to generate a high-voltage to be supplied to the anode of a cathode-ray tube in a television receiver. The flyback-type transformer is composed of a core and windings. The number of turns in the high-voltage windings of the flyback-type pulse transformer must be large if the supplied or primary voltage is small in order to get the necessary high-voltage for the cathode-ray tube operation, and the dimension of the core must also be large. Accordingly, the dimensions of the flyback-type pulse transformer are large, and its size is very large compared with that of other circuit elements. In addition, trouble such as a layer short is often caused by the fine windings of the flyback-type pulse transformer. Therefore, it is difficult to achieve high reliability with a flyback-type pulse transformer. If the output circuit of the flyback-type pulse transformer is short-circuited by a layer short of the windings or a short by an arc between the high-voltage circuit and the other low voltage circuits, there is the possibility of firing because the temperature of the insulator used in the transformer, which is combustible, is increased by the layer-short current or the spark current. Moreover, the over current caused by the short circuit flows to the horizontal output transistor, which drives the flyback-type transformer in a transistorized television receiver, and the horizontal output transistor is broken down. Because the flyback-type pulse transformer is operated magnetically, an undesired magnetic field is generated outside of the shielding casing of the flyback-type pulse transformer. An electrostatic shield is not able to prevent the undesired leakage of the magnetic field.

For this reason, it is difficult to arrange the circuit components of a television set close to each other, even if the circuit components are miniaturized. Accordingly, it is difficult to make the circuit of a television receiver other than a cathode-ray tube small in size.

A ceramic transformer will prevent these drawbacks. However, there has heretofore been no circuit arrangement known for operating a ceramic transformer satisfactorily.

A ceramic transformer is composed of ceramic materials such as barium titanate modified by the addition of certain materials. The ceramic materials can be made to be piezoelectric by a simple polarization process. The suitable ceramic materials have quite low electrical and mechanical losses. For example, the mechanical Qm of a ceramic material which has the chemical composition $Pb(mg_{1/3}Nb_{2/3})_x Ti_y Zr_z$ (where $x+y+z=1$) exceeds a thousand. Because of low intrinsic losses, a suitable circuit arrangement would make it possible to operate a ceramic transformer as a power-handling device with high operating efficiency.

The input and output impedance of the ceramic transformer is high compared with conventional magnetic transformers. The ceramic transformer is thus very suited for a supply means for supplying a high-voltage and a low current.

The flyback-type pulse transformers operated magnetically require many well insulated turns of copper wire for operating at high output voltages. On the other hand, the small size, simplicity, and the absence of a high-voltage winding make the ceramic transformer eminently suitable for the high-voltage generator of a television receiver. According to the publication by H. W. Katz, entitled "Solid State Magnetic and Dielectric Devices" (John Willey & Sons, 1959), the bar-type piezoelectric transformer is suitable for operation at the fundamental or second harmonic modes.

SUMMARY OF THE INVENTION

It is an object of the invention to provide a circuit arrangement capable of operating a ceramic transformer in a high-voltage circuit of a television receiver.

It is another object of the invention to provide a circuit arrangement capable of reducing the change in output voltage of a ceramic transformer which occurs with a temperature variation.

It is another object of the invention to provide a circuit arrangement capable of making a path for DC current in the horizontal deflection circuit of a television circuit without using primary windings such as are present in flyback-type pulse transformers used in the prior art.

To achieve the foregoing objects, a circuit arrangement according to the present invention comprises a ceramic transformer having plural resonant modes at which it is operated by a driving pulse, said driving pulse containing harmonic components for driving the ceramic transformer at the harmonic resonant modes, and a choke coil on a deflection yoke operating as a path for DC current to supply power losses in the horizontal deflection circuit.

DESCRIPTION OF THE DRAWINGS

These and other objects of the invention will be apparent from the following description of the invention taken in connection with the accompanying drawings, in which.

DESCRIPTION OF PREFERRED EMBODIMENTS

Figure 1:
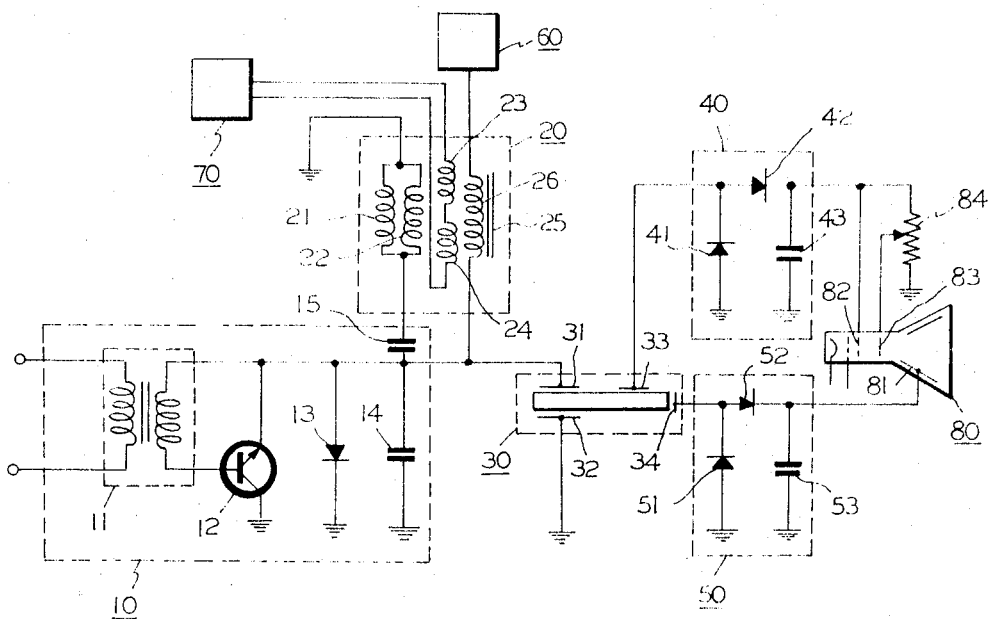
FIG. 1 is a schematic circuit diagram of an embodiment of a high-voltage generator circuit in accordance with the present invention.

Referring to FIG. 1, there is shown a schematic circuit diagram of a high-voltage generator circuit configuration for a television receiver, comprising a ceramic transformer 30 for generating a high-voltage, a horizontal deflection output circuit 10 for generating a pulse voltage, a choke coil 26 for supplying DC power to said horizontal deflection output circuit 10 and a deflection yoke 20 for a cathode-ray tube having said choke coil 26 wound thereon.

Said ceramic transformer 30 has plural resonant modes and is driven by said pulse voltage to compensate for a change of said high-voltage.

Said choke coil 36 induces a magnetic field which is perpendicular to the magnetic fields induced by the horizontal and the vertical coils 21, 22, 23 and 24, respectively.

Said horizontal deflection output circuit 10 excites two resonant modes of ceramic transformer 30. Said ceramic transformer 30 has at least one electrode for an output voltage on a generator part thereof in addition to an electrode 34 for a high output voltage.

Said horizontal deflection output circuit 10 comprises a pulse transformer 11, an output transistor 12, a damper diode 13, and two capacitors 14 and 15. A second winding of said pulse transformer 11 is connected between the base and emitter of said output transistor 12 which has the collector grounded. The anode of said damper diode 13 is connected to the emitter of said transistor 12, and the cathode is grounded. The capacitor 14 is also connected between the emitter of said transistor 12 and ground.

Said deflection yoke 20 comprises horizontal deflection coils 21 and 22 connected in parallel, vertical deflection coils 23 and 24 connected in series, and the choke coil 26 combined with a core 25. Said parallel connected horizontal deflection coils 21 and 22 are connected, at one end, to the emitter of said transistor 12 through the capacitor 15 and at another end to the ground. Said choke coil 26 is connected between a DC supply source 60 and the emitter of said transistor 12. Said series connected vertical deflection coils 23 and 24 are connected, at both ends, to a vertical output circuit 70.

Said ceramic transformer 30 has four electrodes; one is an input electrode 31 connected to the emitter of transistor 12, another is a common ground electrode 32, and the other two electrodes 33 and 34 are output electrodes. Said two electrodes 33 and 34 are connected to independent double voltage-rectifying circuits 40 and 50, respectively.

The electrical operation of this circuit is as follows. The steady state operation will be described for the condition in which the horizontal output transistor 12 is carrying out a switching action. The pulse voltage is applied at the horizontal sweep frequency through a pulse transformer 11 to switch said transistor 12 on. Consequently, a horizontal deflection current flows in said parallel connected deflection coils 21 and 22. During this time, electrical energy is stored in said deflection coils 21 and 22. In the time when said transistor 12 is switched off between pulses of the pulse voltage, the electrical energy stored in the coils begins to move toward the capacitor 14, and this energy movement grows into an electrical oscillation and the damper diode 13 is cut off. After a half cycle of electrical oscillation, said transistor 12 and said damper diode 13 are forward-biased by the electrical oscillation so that the electrical oscillation, is damped. As a result, the electrical oscillation becomes a flyback-type pulse having a pulse width of a half cycle of the oscillation frequency.

In FIG. 1, said capacitor 14 is associated with the ceramic transformer 30. The capacitor 15 improves the decentering of a horizontal deflection on the screen of a cathode-ray tube 80 by cutting off the DC current in the horizontal deflection coils 21 and 22, and also improves the linearity of the horizontal sweep when the capacitance of said capacitor 15 is such that it will resonate, close to the horizontal sweep frequency, with the inductance of the horizontal deflection coils 21 and 22. The power-supplying source 60 supplies the power to the horizontal deflection output circuit 10 through the choke coil 26 on said deflection yoke 20.

The high DC voltage which must be supplied to the anode 81 of the cathode-ray tube 80 is generated by a high-voltage generator circuit by the following process. The ceramic transformer 30 is driven by the flyback-type pulse and generates an alternating high-voltage between the output electrode 34 and ground. This AC high-voltage is rectified by diodes 51 and 52, and filtered by a capacitor 53. The capacitance of said capacitor 53 is mainly represented by the stray capacitance between said anode 81 of cathode-ray tube 80 and ground. On the other hand, it is necessary to obtain a DC voltage for operation of other circuits of the television receiver. For example, a source of a low DC voltage such as 12 volts or 24 volts is often used in a transistorized television receiver of the type operated by a battery. In such a case, it is possible to obtain the DC voltage by using a high-voltage generator circuit according to the present invention. For example, referring to FIG. 1, the DC voltage for the second grid 82 and the third grid 83 of the cathode-ray tube 80 is obtained by rectifying the alternating voltage generated at the output electrode 33 of said ceramic transformer 30. In FIG. 1, this alternating voltage is rectified by diodes 41 and 42, and the capacitor 43 is used for filtering the AC components.

A variable resistor 84 is provided for adjusting the focus of said cathode-ray tube 80.

Figure 2:
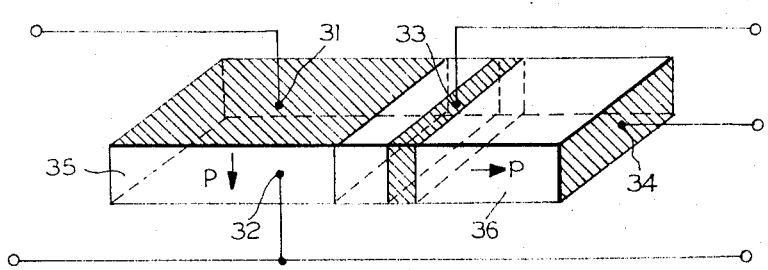
FIG. 2 is a schematic perspective view of the structure of a ceramic transformer adapted for a high-voltage circuit arrangement according to the present invention.

Referring to FIG. 2, which shows a transverse-type piezoelectric ceramic transformer, a driver portion 35 and a generator portion 36 are polarized at right angles to each other as indicated by vectors P. A pair of electrodes 31 and 32 are provided on opposite sides of the driver portion of the ceramic transformer, and electrodes 33 and 34 are provided on the top and end of the generator portion 36. Electrode 31 cooperates with common ground electrode 32 to form an input circuit, while output electrodes 33 and 34, respectively, cooperate with common ground electrode 32 to form output circuits.

When an electric field is applied across said input circuit of electrodes 31 and 32, the ceramic transformer vibrates in the longitudinal mode. The arrangement of electrodes shown in FIG. 2 is suitable for causing the ceramic transformer to operate in the fundamental longitudinal mode as a half wave resonator in which the total length of the ceramic transformer is equal to a half wave length of the resonating frequency, and in the second harmonic longitudinal mode as a one wave resonator in which the total length of the ceramic transformer equals one wave length of the resonating frequency. These two modes are utilized effectively in the circuit arrangement according to the present invention.

The operation of the transverse-type ceramic transformer shown in FIG. 2 is as follows. In FIG. 2, an alternating voltage including the pulse voltage is applied between said electrodes 31 and 32. If the frequency of the alternating voltage applied to said electrodes 31 and 32 is close to the frequency of the half-wave resonator or one-wave resonator, the ceramic transformer vibrates with a large amplitude mechanical strain. As a result, a high electric field can be produced piezoelectrically between said electrodes 34 and 32, and also between electrodes 33 and 32.

In the circuit arrangement according to the present invention, the ceramic transformer is driven by the pulse voltage which has the same repetitive frequency as the horizontal sweep frequency of a television receiver. The horizontal sweep frequency is decided by the broadcasting standards, and is approximately constant. Then the horizontal sweep frequency can not be selected freely in a television receiver of the common home entertainment type.

The resonating frequency of the ceramic transformer is given by a following equation:

$$f = C/2L \quad (1)$$

wherein $f$ is the fundamental resonating frequency; $C$ is the velocity of sound wave propagation in the ceramic material, and $L$ is the total length of the ceramic transformer. Equation (1) shows that the length of the ceramic transformer is very important for causing the ceramic transformer to resonate at the horizontal sweep frequency or its harmonic frequencies. In addition, when the ceramic transformer is used to generate the high-voltage in a television receiver, a change of the ambient temperature and self heating of the ceramic transformer changes the resonating frequency of the ceramic transformer, because the ceramic material used for the transformer usually has a large temperature coefficient of the resonating frequency. In order to get the large step up ratio which is needed, the ceramic transformer should have a sufficiently large mechanical quality factor Qm that the bandwidth of the resonating frequency in a response curve becomes very narrow. When an alternating voltage having an approximately constant frequency drives the ceramic transformer, the variation in the resonating frequency of the ceramic transformer with the temperature changes the output high-voltage, even if the resonating frequency coincides accurately with the horizontal sweep frequency or its harmonic frequency at the initial operating condition. The driving method according to the present invention also compensates for this variation in the resonating frequency. A typical flyback-type pulse or rectangular pulse waveforms are suitable for driving the ceramic transformer when the plural resonating modes are utilized to compensate for the variation of the resonating frequency. These pulse voltages have fundamental frequency and harmonic frequency components such as $f_1 = 1/T$, $f_2 = 2/T$, ... $f_n = n/T$, wherein $T$ is a repeating period, and the amplitude of each component depends on the pulse width and the shape of the pulse. At these harmonic frequency components, the ceramic transformer can be driven similarly at the fundamental frequency. Usually, the frequency $f$ of the one wave resonating mode is nearly twice the frequency $f_{\lambda/2}$ of the half wave resonating mode. The difference between the frequency $f_\lambda$ and twice the frequency $f_{\lambda/2}$ is several tens of cycles, when the frequency $f_{\lambda/2}$ is equal to the horizontal sweep frequency of a television receiver.

When the ceramic transformer is driven by the pulse voltage which has a constant pulse width and a repetitive frequency nearly equal to the fundamental resonating frequency of the ceramic transformer, there are two maximum peak voltages in the characteristic curve of the output high-voltage versus the repetitive frequency of driving pulse. The one maximum peak voltage is due to the frequency component $f_1=1/T$ of the pulse, and the other maximum peak voltage is due to the frequency component $f_2=2/T$ contained in the driving pulse. If a pulse width is chosen for the driving pulse which has the same value of peak to peak voltage as that of the sine wave voltage, the bandwidth of the repetitive frequency response at an output voltage lower by a few decibels than the maximum output voltage becomes wider than that when the ceramic transformer is driven by the sine wave voltage. The repetitive frequency of the driving pulse is equal to the horizontal sweep frequency fixed by the broadcasting standards in a television receiver. However, the horizontal sweep frequency is allowed to have a frequency drift less than 0.5 percent according to the synchronization standards of television systems. The resonating frequency of the ceramic transformer is also changed due to the variation of the ambient temperature and self heating of the ceramic transformer. In order to avoid a change in the output high-voltage with these frequency variations, the resonating frequency should be chosen close to the center between the driving frequencies for the two maximum output high-voltages. The difference between the resonating frequency $f(\lambda/2)$ and $f\lambda/2$ is nearly constant in spite of any change of the resonating frequency due to a change of temperature of the ceramic transformer.

According to the present invention, in FIG. 1, the AC voltage which is connected to a DC voltage for the second and third grids 82 and 83 of the cathode-ray tube 80 is also supplied by the ceramic transformer 30 having the output electrode 33 on the generator portion 36. The diodes 41 and 42 and the capacitor 43 in the grid circuit are used to obtain the DC voltage for the second and third grids 82 and 83 of the cathode-ray tube 80. The position of said electrode 33 is important in the circuit arrangement according to the present invention, because the two resonating modes are driven by the driving pulse produced by said horizontal deflection circuit 10. It has been discovered that the electrode 33 should be located between the nodal points of the two modes in order to minimize the change of the output voltage at the electrode 33 when the operating mode is transferred from one mode to the other mode. Said electrode 33 is a narrow band electrode located on the four sides of said generator portion 36 of said ceramic transformer 30.

Referring again to FIG. 1, DC current is supplied through the choke coil 26 from supplying source 60. The path for the DC current in the horizontal deflection circuit 10 is needed even in a high-voltage generator circuit using a ceramic transformer in order to obtain a good linearity of the horizontal sweep and to avoid a decentering of the sweep.

Figure 3:
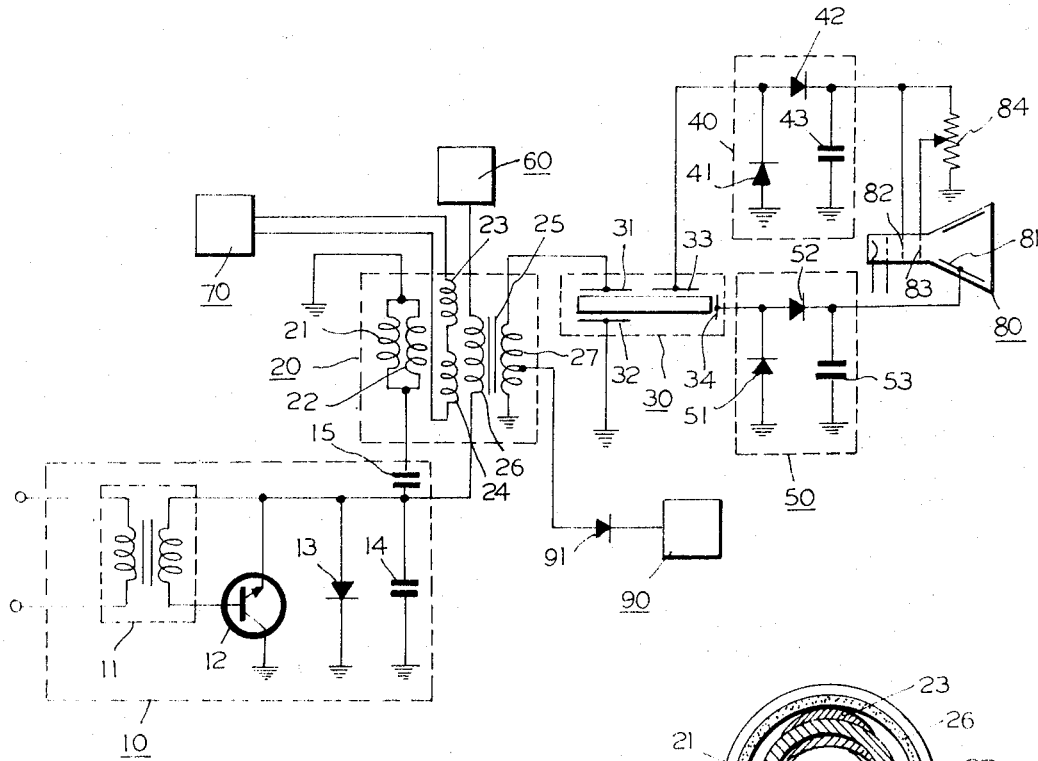
FIG. 3 is a schematic circuit diagram of another embodiment of a high-voltage circuit arrangement according to the present invention.

Referring to FIG. 3, wherein similar reference numbers designate components similar to those of FIG. 1, the connection and operation of the pulse transformer 11, the horizontal output transistor 12, the damper diode 13, the capacitors 14 and 15, the horizontal deflection coils 21 and 22, the vertical deflection coils 23 and 24, and the choke coil 26 are the same as those of FIG. 1. Said choke coil 26 further comprises a secondary coil 27. The input electrode 31 of the ceramic transformer 30 is connected to said secondary coil 27 wound around the choke coil 26. These two coils 26 and 27 form a kind of transformer. Said coil 27 has a tap connected to a diode 91. The output electrodes 33 and 34 of the transformer are connected to the independent double voltage rectifying circuits 40 and 50, respectively.

The flyback-type pulse is induced in the emitter of said horizontal output transistor 12 in a way similar to that described in connection with FIG. 1. This flyback-type pulse voltage is stepped up by the coils 26 and 27. DC voltage for the video output circuit 90 is also supplied from a tap of said coil 27 after rectifying by said diode 91. Said coils 26 and 27 have a mutually loose coupling so that the pulse appearing in said coil 27 is clipped.

According to this process, the wave form of the pulse induced in said coil 27 becomes square. Such a clipped pulse voltage having a suitable pulse width contains fundamental and second harmonic components which has a larger amplitude than the flyback-type pulse voltage. Therefore, the clipped pulse is suitable for driving the ceramic transformer which is operated by the same driving pulse in two resonating modes, the fundamental and the second harmonic resonating modes. The clipped pulse induced in said coil 27 is applied to the input electrode 31 of the ceramic transformer 30. As a result, the high-voltage is generated in the output circuit between the electrodes 34 and 32, and is rectified by the diodes 51 and 52, and is filtered by the capacitor 53, which has a stray capacitance of the anode 81 of cathode-ray tube 80. Thus, the DC high-voltage is obtained for the anode 81 of cathode-ray tube 80. The DC voltage for the second and third grid 82, 83 of the cathode-ray tube 80 is also supplied from the ceramic transformer 30 by the output electrode 33 on the generator portion 36 thereof. The alternating voltage induced in said output electrode 33 is rectified by the diodes 41 and 42, and filtered by the capacitor 43.

Figure 4A:
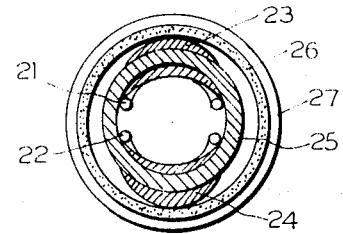
FIG. 4a is a cross-sectional view of a deflection yoke taken perpendicular to the axis thereof, used in a high-voltage circuit arrangement according to the present invention.
Figure 4B:
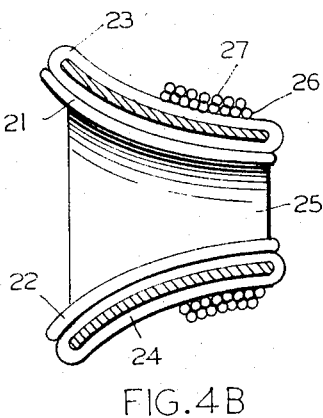
FIG. 4b is a cross-sectional view of the deflection yoke of FIG. 4a taken parallel with the axis thereof.

Referring to FIGS. 4a and 4b, there is shown a deflection yoke used in the circuit arrangement according to the present invention. Said deflection yoke is composed of a pair of horizontal deflection coils 21 and 22, a pair of vertical deflection coils 23 and 24, a choke coil 26, another coil 27, and a core 25 which is a path of the magnetic fluxes of these coils. Three types of coils are shown in the figure. The coils 21 and 22 are saddle-type coils for horizontal deflection, and coils 23 and 24 are troidal-type coils and distributed winding coils. The coils 26 and 27 are solenoid wound around the deflection coils 21, 22, 23 and 24. Said coil 26 is used as the path of DC current. If necessary, another coil 27 is wound around the coil 26. The magnetic fields yielded by these coils 26 and 27 are perpendicular to the magnetic fields of horizontal and vertical deflection coils 21, 22, 23, and 24, respectively.

FIG. 4a is a cross-sectional view of the deflection yoke taken perpendicular to the axis thereof. Said choke coil 26 and said other coil 27 are used as a kind of transformer. In this case, the choke coil 26 is the primary coil and the other coil 27 is the secondary coil of the transformer.

FIG. 4b is a cross-sectional view of the deflection yoke taken parallel with the axis thereof. Said core 25 forms an open path magnetic field for a kind of transformer composed of the primary coil 26 and the secondary coil 27, so that the primary coil 26 and the secondary coil 27 have a mutually loose coupling and a large DC current can flow in the primary coil 26. Accordingly, the primary coil 26 can operate as a path for DC current in the horizontal deflection circuit, and a kind of transformer composed of primary and secondary coils 26 and 27 is used to supply pulses to the necessary circuits in the television receiver.

An example of design parameters of the circuit shown in FIG. 3 is as follows. The ceramic transformer, for example, has the following specified dimensions:
length = 111.7 mm.
width = 29.6 mm.
height = 5.6 mm.
width of the electrode 33=5.0 mm.

As the ceramic material, PCM-32" is used. (Electric Components Catalog; English Edition, 1967 published on Apr. 10, 1967; Matsushita Electric Industrial Co., Ltd., Japan). The temperature coefficient of the resonating frequency is —0.03 percent/°C. The peak to peak voltage of the driving pulse for the ceramic transformer is 130$V_{pp}$. The DC high-voltage obtained is 10 kilovolts. The supply voltage for the horizontal output circuit is —12 volts.

Figure 5:
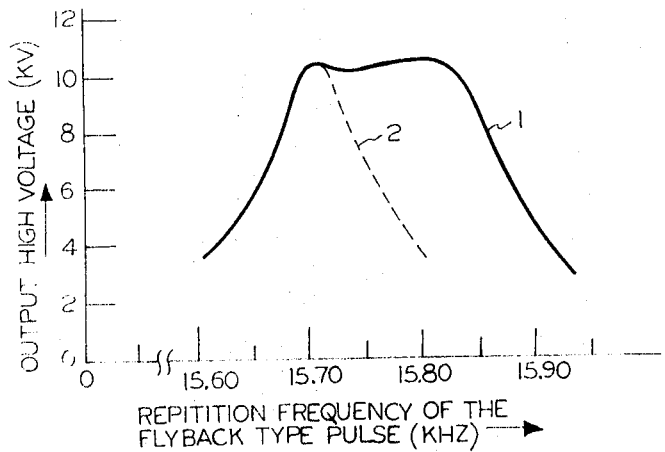
FIG. 5 is a graph illustrating the representative characteristic of driving frequency versus output high-voltage obtained by the high-voltage circuit of FIG. 3.

The solid line 1 in FIG. 5 shows the relation of the repetitive frequency and the output high-voltage for the above specified operating conditions. In FIG. 5, the dotted curve 2 shows the relation of the repetitive frequency and the output high-voltage for the case in which the ceramic transformer is driven by the sine wave voltage close to the horizontal sweep frequency. The dotted curve 2 indicates that under such condition, the ceramic transformer is operated only in the fundamental mode, that is a half wave resonator, at a frequency of 15.7 kHz. and there is no other resonation near to a frequency of 15.7 kHz. On the other hand, the solid curve 1 indicates that there are two maximum peaks of the output high-voltage, because the fundamental and second harmonic components of the flyback-type pulse can drive the ceramic transformer in both the half-wave and one-wave length resonant mode, even in the range of the repetitive frequency which is close to the horizontal sweep frequency.

In a practical application of the ceramic transformer for a television receiver, the stray capacitance of the output electrode has a strong influence on the resonating frequency of the ceramic transformer. However, by utilizing this stray capacitance, the resonating frequency of the ceramic transformer can be easily adjusted and accordingly a large tolerance for the size of a ceramic transformer is allowed.

Further, according to the invention, the change in the high-voltage applied to the anode of the cathode-ray tube is reduced by widening the frequency range in which the high-voltage is generated. Therefore, it becomes possible to use a ceramic transformer in order to generate a stable high-voltage in the television receiver.

Further, the volume of the high-voltage generator circuits using a ceramic transformer is much smaller than that using a flyback-type pulse transformer, and accordingly it is effective when the circuit components are miniaturized.

Further, according to the invention, good safety can be achieved because the ceramic transformer is incombustible.

The reliability is also improved by eliminating the fine winding of the flyback-type pulse transformer.

The ceramic transformer operates piezoelectrically, and therefore a large magnetic field is not induced while generating the high-voltage. Accordingly, unwanted radiations can be shielded by using only electrostatic shielding.

What we claim is:

1. A high-voltage generator circuit for a television receiver, comprising:

a ceramic transformer having a frequency difference between the frequency of the one-wave resonating mode thereof and twice the frequency of the half-wave resonating mode thereof and being of a material in which the resonating mode changes as the temperature of said ceramic transformer changes when the repetitive frequency of the driving pulse voltage is constant; and a horizontal deflection output circuit coupled to the input of said ceramic transformer, said horizontal deflection output circuit generating a pulse voltage containing a fundamental frequency component exciting said half-wave resonating mode of said ceramic transformer and containing a second harmonic-frequency component exciting said one-wave resonating mode of said ceramic transformer, said ceramic transformer thereby being excited at both said half-wave resonating mode and said one-wave resonating mode, whereby the high output voltage remains substantially constant despite temperature changes of the material of the transformer.